United States Patent [19]

Phipps et al.

[11] 4,395,214
[45] Jul. 26, 1983

[54] FOAM EXTRUSION APPARATUS HAVING DOWNSTREAM UPPER AND LOWER HINGED SHAPING MEANS AND SIDE RESTRAINING MEANS

[75] Inventors: Arthur L. Phipps, Tallmadge; Ben Stoyanov, Akron, both of Ohio

[73] Assignee: U.C. Industries, Tallmadge, Ohio

[21] Appl. No.: 297,036

[22] Filed: Aug. 27, 1981

[51] Int. Cl.[3] .......................... B29D 27/00; B29F 3/04
[52] U.S. Cl. ..................................... 425/214; 264/51; 425/325; 425/817 C
[58] Field of Search .................... 264/53, 51; 425/325, 425/817 C, 214

[56] References Cited

U.S. PATENT DOCUMENTS

| | | | |
|---|---|---|---|
| Re. 27,243 | 12/1971 | Sare et al. .......................... | 264/51 X |
| 2,740,157 | 4/1956 | McCurdy et al. ..................... | 264/53 |
| 3,431,163 | 3/1969 | Gilbert ............................. | 264/53 X |
| 3,704,083 | 11/1972 | Phipps ............................. | 425/378 X |
| 3,897,528 | 7/1975 | Suh ............................... | 264/53 X |
| 3,914,085 | 10/1975 | Krubelskie ....................... | 425/381 X |
| 4,044,084 | 8/1977 | Phipps ............................. | 264/51 |
| 4,211,739 | 7/1980 | Phipps ............................. | 264/51 |
| 4,234,529 | 11/1980 | Phipps ............................. | 264/51 |
| 4,292,019 | 9/1981 | Hay et al. ......................... | 264/53 X |

FOREIGN PATENT DOCUMENTS

451864 10/1948 Canada .................................. 264/53

*Primary Examiner*—Philip E. Anderson

*Attorney, Agent, or Firm*—Maky, Renner, Otto & Boisselle

[57] ABSTRACT

An apparatus is provided for forming, shaping and surface finishing a foam extrudate as it expands and passes from an extrusion die to obtain, in particular, foam or cellular bodies having a substantial thickness in relation to their width. The apparatus comprises opposed extrudate shaping members located on opposite sides of the die orifice of the extrusion die and extending immediately downstream therefrom. The upstream end of each shaping member is hingedly supported adjacent and preferably slightly upstream from the die orifice, and the hinged supports at the upstream ends of the shaping members are uniformly adjustable towards and away from the central transversely extending plane of the extrusion die. The downstream end of each shaping member is hinged to a respective conveyor or surface finishing member of a conveyor or surface finishing assembly. The conveyor or surface finishing members each include a moving belt backed by relatively large area plates, and together form therebetween a downstream continuation of the passageway formed between the shaping members. One of the conveyors is air balanced or floated at its upstream and downstream ends by piston-cylinder assemblies and urged against the extrudate at controlled pressure. The other conveyor is adjustably yet fixedly secured at its upstream and downstream ends.

37 Claims, 6 Drawing Figures

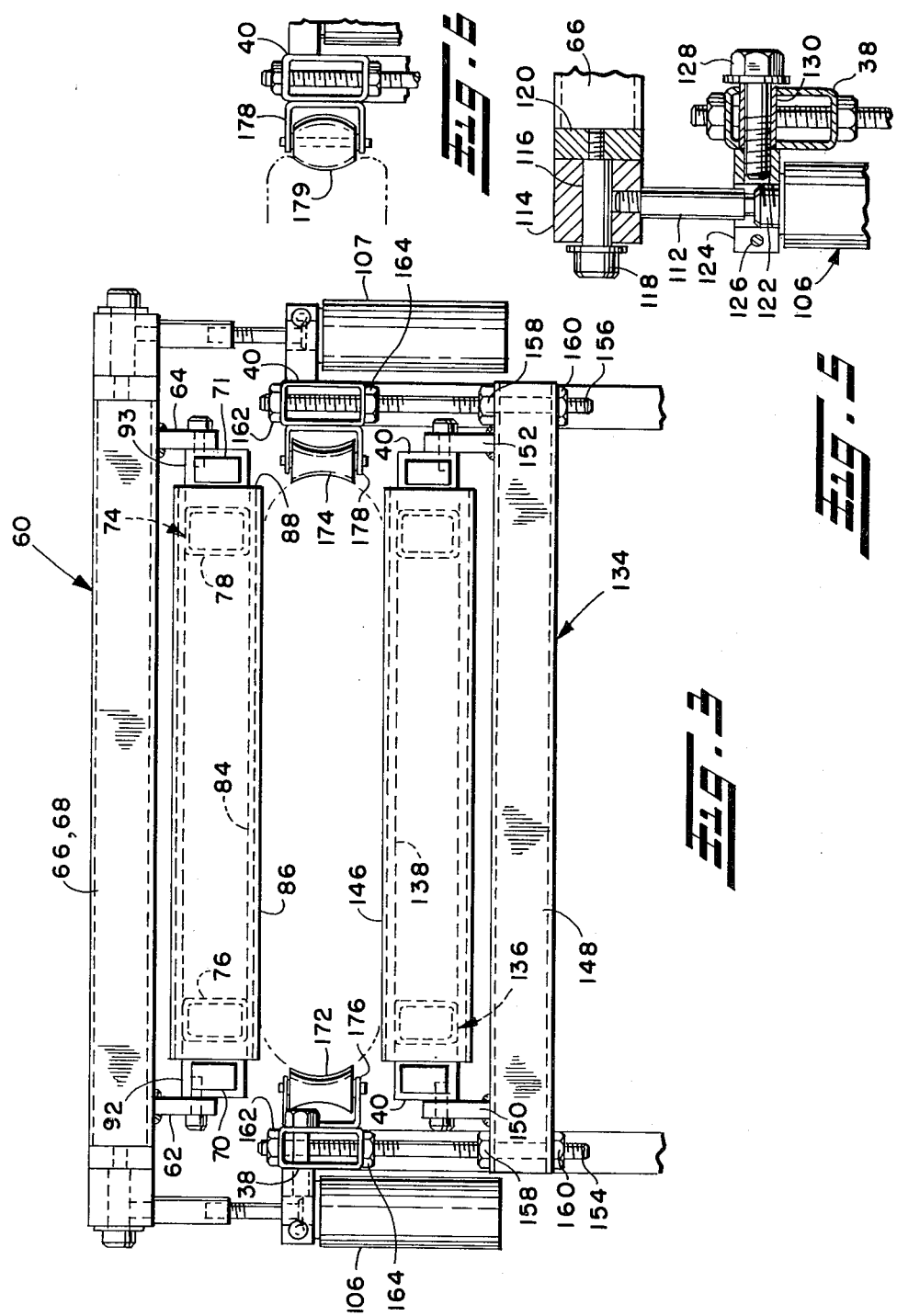

FOAM EXTRUSION APPARATUS HAVING DOWNSTREAM UPPER AND LOWER HINGED SHAPING MEANS AND SIDE RESTRAINING MEANS

This invention relates to an improved apparatus for forming, shaping and surface finishing elongated bodies of plastic foam during formation of such bodies upon extrusion through a die orifice to obtain foam or cellular billets, logs, or the like of substantially uniform thickness.

BACKGROUND OF THE INVENTION

In the production of rigid boards, slabs, billets, logs, or the like, a foamable thermoplastic resin such as styrene or polyurethane incorporating a blowing agent is extruded through a die orifice. As soon as the extrudate leaves the die orifice, it is at a much lower pressure, preferably a vacuum, and immediately begins to expand and move away from the die orifice. The extrudate will expand away from the die orifice increasing in size three-dimensionally. If such expansion is not properly controlled and the extrudate properly directed from the die orifice, particularly as the extrudate cools and begins to cure or set, undesirable dimensional variations may result such as corrugations as well as undesirable variations in density and cell orientation. It is important that the product be of uniform density, uniform thickness and with minimum cell distortion. It also is important that the finished surface be free of distortions, surface blemishes, cracks or the like.

Various apparatus and methods of forming low density boards, slabs, billets, logs, or the like are known, and examples thereof may be seen in U.S. Pat. Nos. 3,704,083; 4,044,084; 4,211,739 and 4,234,529. Generally, the foamable material is extruded into a vacuum chamber and its expansion therein may be properly controlled by various forming, shaping and finishing apparatus to obtain the desired product. As disclosed in U.S. Pat. No. 4,234,529, a forming roll assembly is positioned adjacent and immediately downstream of the die orifice of the extrusion die which preferably is arcuate. The forming roll assembly includes opposed sets of curved rolls extending generally circularly of the center of the extrusion die on opposite sides of the extrudate pass line or flow path. The rolls on at least one side of the extrudate pass line are air balanced or floated so that the pressure on the opposite side of the balance essentially represents a true approximation of the pressure of the roll directly against the extrudate. After passing between the roll sets, the extrudate passes through a surface finishing apparatus which comprises relatively large area top and bottom plates or belts backed by such plates. One or both of such plates or belts may be floatingly supported in the same manner as each of the rolls of the roll sets as aforedescribed, and one is pivotally supported at its center of gravity in order to permit it to pivot with respect to the extrudate pass line.

The forming, shaping and finishing apparatus disclosed in such U.S. Pat. No. 4,234,529, while useful in forming billets, logs, and the like, is more suited to forming boards and slabs which are considerably more wide than thick. Such boards and slabs are useful as insulation and sheathing in houses and buildings. Applicants herein have devised a foam extrusion apparatus which is suited particularly to the formation of billets, logs, or the like which have a substantial thickness in relation to their width. Such billets and logs are useful as flotation in watercraft and/or as stock from which various articles may be formed such as ornaments and packing material.

In addition to the apparatus and methods disclosed in the aforementioned patents, various other apparatus and methods are known in the art and examples thereof may be seen in U.S. Pat. Nos. 2,740,157; 3,431,163; 3,897,528, and 3,914,085, and in U.S. Pat. No. Re. 27,243. In the first of these patents, there is described an apparatus which includes generally parallel foam shaping members positioned on opposite sides of the extrudate pass line immediately downstream from the die orifice. In one embodiment, each shaping member includes two diverging rows of rolls which are supported between parallel frame plates. Provision is made for slight adjustment of such frame plates to vary slightly the spacing and relative angular inclination of the two diverging rows of rolls. In another embodiment disclosed in such patent, the shaping members are in the form of two substantially parallel plates, one of which has a hinged extension downstream of the die orifice which is spring biased at its distal end towards a fixed downstream extension of the other shaping member.

In U.S. Pat. No. 3,431,163, the extrusion apparatus described includes opposed steel plates having planar surfaces which define a zone into which the foamable material is extruded. Such steel plates are set at various angles to each other as desired.

In U.S. Pat. No. 3,897,528, the extrusion apparatus described also comprises opposed shaping members. Such shaping members each include a fixed plate rigidly affixed to the extrusion die and a hinged plate pivotally affixed to the fixed plate downstream of the die orifice. The hinged plate of each shaping member is capable of limited angular adjustment relative to the fixed plate, such adjustment being effected by positioning means such as a hydraulic cylinder.

In U.S. Pat. No.3,914,085, an extrudate sizing or guide assembly is affixed to the face of the extrusion die. Affixed to such assembly and remotely from the die face are opposed forming members. The forming members are pivotally attached to such assembly and positioned by positioning means such as screws or hydraulic cylinders. A somewhat similar arrangement is disclosed in Canadian Pat. No. 451,864.

In U.S. Pat. No. Re. 27,243, a puller component is located downstream of an extrusion die. The puller component consists of two parallel endless belt assemblies, one of which is adjustable towards and away from the other. Both endless belts are driven by an electric motor through an endless chain.

SUMMARY OF THE INVENTION

The present invention provides a foam extrusion apparatus for forming, shaping and surface finishing a foam extrudate as it expands and passes from an extrusion die to obtain, in particular, foam or cellular bodies having a substantial thickness in relation to their width, such as billets, logs, or the like. Briefly, the apparatus comprises opposed extrudate shaping or restraining members located on opposite sides of the die orifice of the extrusion die and extending immediately downstream therefrom. The shaping members each may include a flat or slightly concave plate or a coplanar or slightly concave row of rolls, and together form therebetween a passageway for the extrudate exiting the die orifice. The upstream end of each shaping member is hingedly supported adjacent and preferably slightly upstream from the die orifice, whereas its downstream end is hinged to the respective conveyor or surface finishing member of a conveyor or surface finishing assembly. The hinged supports at the upstream ends of the opposed shaping members are uniformly adjustable towards and away from the central transversely extending plane of the extrusion die. At the die orifice, the shaping members preferably are spaced apart a distance considerably greater than the gap thickness of the die orifice such that the extrudate expands rapidly outwardly in all directions including slightly upstream of the die orifice.

The conveyors or surface finishing members each include relatively large area top and bottom plates or preferably belts backed by such plates, and together form therebetween a downstream continuation of the passageway formed between the shaping members. One of the conveyors is air balanced or floated at its upstream and downstream ends by piston-cylinder assemblies and urged against the extrudate at controlled pressure. The other conveyor is adjustably yet fixedly secured at its upstream and downstream ends. Alternatively, such other conveyor may be adjustably fixed only at one end and adjustably floated at its other end by piston-cylinder assemblies. In addition, the belts of the conveyors may be power driven at a controlled speed faster, slower, or the same as the speed of the extrudate passing therebetween.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3 is an enlarged end elevation of the apparatus of FIG. 1 as seen substantially from the line 3—3 thereof;

FIG. 4 is an enlarged portion of the top plan view of FIG. 2 as seen substantially from the line 4—4 of FIG. 1, there additionally being shown an air motor employed in accordance with the invention;

FIG. 5 is an enlarged fragmentary lefthand portion of the end elevation of FIG. 3, with parts thereof being shown in section; and FIG. 6 shows an alternate form of edge roll useful in the apparatus of FIG. 1.

DETAILED DESCRIPTION

Foam Extrusion Apparatus—General Arrangement

Figure 1:
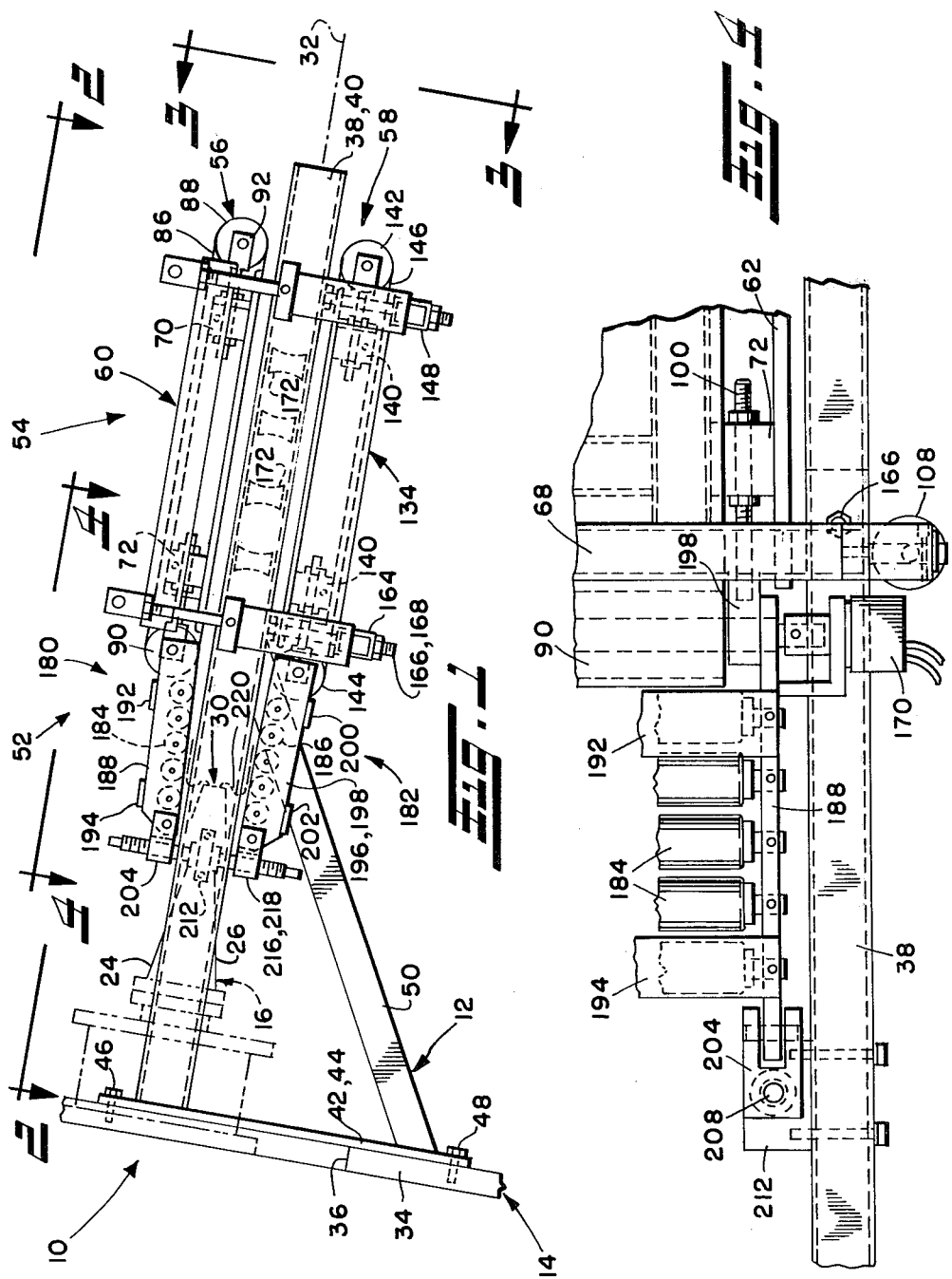
FIG. 1 is a side elevation of a foam extrusion apparatus according to the present invention.
Figure 2:
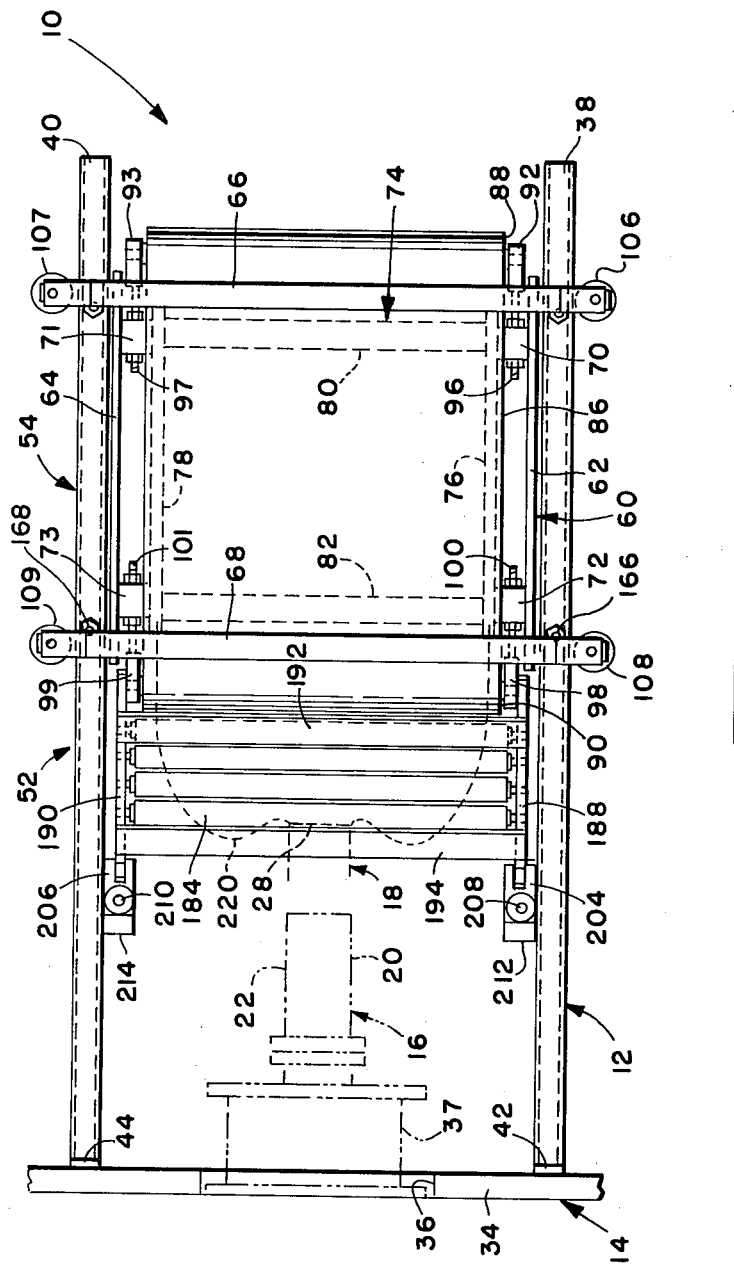
FIG. 2 is a top plan view of the apparatus of FIG. 1 as seen substantially from the line 2—2 thereof.

Referring now in detail to the drawings and initially to FIGS. 1 and 2, it will be seen that the foam extrusion apparatus designated generally by reference numeral 10 is supported on a frame 12 to project in cantilever fashion from a bulkhead 14. The bulkhead 14 may be of the type seen in the above-mentioned U.S. Pat. No. 4,211,739, and is adapted to close the upper end of an inclined barometric leg or vacuum chamber as seen in such patent. A liquid barrier or other means may be provided at the downstream end of the barometric leg to maintain isolation between the vacuum therein and the external atmosphere, all of which is described in detail in U.S. Pat. No. 4,199,310. Although the apparatus is intended for use in a vacuum chamber as indicated, such apparatus, however, may be used equally well in an atmospheric extrusion line.

The extrusion die shown in phantom lines at 16 also may be supported on the bulkhead 14 and connected to an extruder in a manner similar to that seen in U.S. Pat. No. 4,211,739. Regardless of the particular means employed to support the extrusion die 16, preferably such die is movable axially such as from its position seen at 16 to its position seen at 18. Such extrusion die has parallel side walls 20 and 22 and inclined top and bottom walls 24 and 26. The end face 28 of the extrusion die has a die orifice indicated at 30 through which extends the extrudate pass line or, more accurately, plane 32. It will be appreciated below that the top and bottom walls 24 and 26 are inclined or tapered as indicated to ensure clearance with the hereinafter described foam extrudate shaping or restraining assembly.

The bulkhead 14 includes a bearing ring or plate 34 which is somewhat different than that shown in U.S. Pat. No. 4,211,739 in that it extends substantially radially inwardly into the vacuum chamber and has a much smaller central opening 36 that accommodates the extrusion die support and connecting assembly 37. As a result, the main frame 12 can be secured directly to the bearing plate 34 without the need for angle irons or the like.

The main frame 12 may be fabricated essentially by welding and includes parallel tubular main frame elements 38 and 40 generally in alignment with the extrudate pass line 32. The proximal ends of the frame elements 38 and 40 are secured, respectively, to substantially vertical plates 42 and 44 each in turn secured top and bottom by fasteners 46 and 48 to the bulkhead bearing plate 16. As best seen in FIG. 1, the main frame elements 38 and 40 project in cantilever fashion from the bulkhead 14 generally on opposite sides of the pass line 32. To rigidly support the main frame elements 38 and 40 in the indicated cantilever fashion, each main frame element 38, 40 is provided with a relatively short oblique support 50 connected between such frame member and the lower end of the respective vertical plate 42, 44.

The primary purpose of the main frame 12 is to support the foam extrudate shaping or restraining assembly indicated generally at 52 and the conveyor or surface finishing assembly indicated generally at 54, which are respectively positioned downstream of the extrusion die 20 along the extrudate pass line or flow path 32.

THE CONVEYOR OR SURFACE FINISHING ASSEMBLY 54

The conveyor or surface finishing assembly 54 comprises upper and lower extrudate surface engaging members which in the illustrated embodiment include upper and lower belt assemblies or conveyors indicated generally at 56 and 58, respectively.

With additional reference to FIG. 3, the upper conveyor 56 can be seen to include a rectangular conveyor support frame 60 consisting of parallel vertical side plates 62 and 64 secured to the underside of transverse tubular frame members 66 and 68. Secured to the side plates 62 and 64 are mounting blocks 70–73, there being four such blocks located at the four interior corners of the rectangular support frame 60. The mounting blocks 70-73 support interiorly thereof a rectangular plate support frame 74 which is disposed beneath the conveyor support frame 60 as seen in FIG. 3. The plate support frame 74 includes parallel tubular side frame members 76 and 78 secured to the blocks 70-73 and parallel transverse tubular frame members 80 and 82. The side frame members 76 and 78 and transverse frame members 80 and 82 together support therebeneath a rectangular, large area belt backing plate 84 which backs an endless belt 86 between the belt sheaves or rollers 88 and 90.

The belt rollers 88 and 90 are located respectively at the downstream and upstream ends of the upper conveyor 56. The downstream belt roller 88 has its end journals secured in brackets 92 and 93 which include threaded rods 96 and 97 that pass through the mounting blocks 70 and 71, respectively. The threaded rods 96 and 97 are adjustably fixed to the mounting blocks by opposed nuts which engage opposite sides of the mounting blocks as indicated. Similarly, the upstream belt roller 90 has its end journals secured in brackets 98 and 99 which include threaded rods 100 and 101 adjustably secured to the mounting blocks 72 and 83, respectively. By adjusting the threaded rods with respect to the mounting blocks, the spacing between the belt rollers 88 and 90, and hence the tension of the belt 86, can be adjusted. In addition, the belt rollers 88 and 90 and belt 86 can be adjusted as a unit upstream and downstream along the extrudate pass line 32.

The upper conveyor 56 is supported on the main frame 12 by four piston-cylinder assemblies 106-109. The rods of such assemblies are pivotally connected to respective ends of the tubular transverse frame members 66 and 68 whereas the cylinders of the assemblies are pivotally connected to the main frame elements 38 and 40. As a result, the assemblies at each side of the conveyor form with the conveyor a four bar linkage with the two links (the assemblies) connected to the fixed link (the main frame elements) being longitudinally adjustable. Accordingly, the upper conveyor is supported by such assemblies for movement toward and away from the extrudate pass line 32 as well as swingingly for slight movement along the extrudate pass line, i.e., parallel to such pass line.

In FIG. 5, the rod and cylinder pivot connections for the piston-cylinder assembly 106 can best be seen and are illustrative of the rod and cylinder pivot connections for the other assemblies 107-109. As seen at the top of FIG. 5, the end of the rod extension 112 is threaded in a radial bore in a collar 114. The collar 114 is fitted on a sleeve 116 through which extends a pivot bolt 118 secured to an end plate 120 closing the open end of the tubular frame member 66. The sleeve 114 is slightly longer than the collar 114 so that the collar is freely rotatable thereon yet journaled between the head of the bolt 118 and end plate 120. As seen at the bottom of FIG. 5, the rod end of the cylinder 121 has an externally threaded collar 122 clamped in a split bracket 124 by clamp fastener 126. The split bracket 124 is pivotally secured to the main frame element 38 by pivot bolt 128 and sleeve 130 as indicated.

The piston-cylinder assemblies 106-109 preferably are of the type disclosed in U.S. Pat. No. 4,234,529. Each assembly is coupled to a controlled source of air pressure and venting (not shown) accurately to control both the spacing between the upper and lower conveyors 56 and 58 and the pressure exerted thereby on the extrudate passing therebetween. As in such patent, pressure is applied beneath the piston of each assembly to cause the upper conveyor to float compensating for the tare weight thereof and, finally controlled pressure above each piston controls the pressure of the upper conveyor against the foaming extrudate, and, of course, the pressure of the extrudate against the lower conveyor.

Reverting to FIGS. 1 and 3, the lower conveyor 58 can be seen to be constructed similarly to the upper conveyor 56 but differently supported. The lower conveyor 58 includes a conveyor support frame 134 which supports the backing plate support frame 136 and belt backing plate 138 through the mounting blocks 140. Such frame also supports belt sheaves or rollers 142 and 144 in the adjustable fashion indicated. Trained about the rollers is a belt 146 backed by the backing plate 138.

As best seen in FIG. 3, the ends of the downstream transverse frame member 148 of the lower conveyor support frame 134 project beyond the side plates 150 and 152 of such frame for passage therethrough of substantially vertical threaded tie rods 154 and 156. Each projecting end of the frame member 148 is adjustably secured to the lower end of the respective tie rods 154, 156 by opposed nuts 158 and 160. The nuts 158 and 160 are threaded on the respective tie rods 154, 156 and engage top and bottom the respective projecting end of the transverse frame member 148. The tie rods 154 and 156 respectively depend from and pass through the main frame elements 38 and 40 and are adjustably secured thereto by opposed nuts 162 and 164 as indicated. In this manner, the downstream end of the lower conveyor support frame 134 is supported below the main frame elements 38 and 40 and adjustable toward and away from the extrudate pass line 32.

In like manner, the upstream transverse frame member 164 of the frame 134 is adjustably yet fixedly supported at its ends beneath the main frame elements 38 and 40 by tie rods 166 and 168, respectively. Accordingly, the upstream end of the lower conveyor support frame 134 can be adjusted toward and away from the extrudate pass line 32, and also independently of the downstream end of the support frame 134 so that the angular inclination of such frame may be varied slightly with respect to the extrudate pass line as desired.

Although both the upstream and downstream ends of the lower conveyor 56 may be adjustably yet fixedly supported as indicated, one end may be so supported while the other end is adjustably and floatingly supported such as by piston-cylinder assemblies in a manner similar to that indicated above in connection with the upper conveyor 56, such other end preferably being the downstream end.

In FIG. 4, it will be seen that the belt 86 of the upper conveyor 56 may be power driven such as by the air or torque motor 170. The air motor 170 is connected as indicated to the end journal of the upstream belt roller 90 of such conveyor. The motor 170 may move the belt at either the same speed as the extrudate, somewhat faster than the extrudate, or at a speed slower than the extrudate to impart the desired wiping or surface finish action to the major planar side surfaces of the product being formed as well as to ensure proper formation and shaping of the extrudate by the shaping assembly 52 hereinafter described in detail. For controlling the speed of the belt at a rate slower than the extrudate, a drag brake or reverse torque motor may be utilized in place of the motor 170. In like manner, the speed of the belt 146 of the lower conveyor 58 may be similarly controlled.

While the upper and lower conveyors 56 and 58 control the final shaping and impart the desired finish to the major planar side surfaces of the product being formed, desirably the edges of the extrudate are restrained by means of transversely opposed rows or series of profiled edge rolls 172 and 174 seen in FIGS. 1 and 3. As illustrated, each row may include four such profiled rolls 172, 174 secured to the main frame elements 38, 40 by clevises 176, 178, respectively, with their axes normal to the extrudate flow path 32. It can be seen in FIG. 3 that the edge rolls may have a concave profile adapted to engage the edge of the extrudate and restrain it to the desired width of the final product. Alternatively, there may be used edge rolls of the type seen at 179 in FIG. 6 which have a convex profile that places a slight depression in the edge of the product.

THE SHAPING OR RESTRAINING ASSEMBLY 52

As seen in FIGS. 1, 2 and 4, the shaping or restraining assembly 52 comprises upper and lower shaping members which in the illustrated embodiment include upper and lower shaping roll assemblies 180 and 182, respectively. As illustrated, the upper roll assembly may include a row of five rolls commonly identified by reference numeral 184 whereas the lower roll assembly includes a row of five lower rolls 186 each opposed to a corresponding roll in the upper assembly. It will of course be appreciated that fewer or more than five rolls may be employed in one or the other assembly. Moreover, the rolls need not always rotate and hence may take the form of bars, or alternatively, a large area plate may be substituted for each row of rolls. The rolls of one or both roll assemblies also may be driven at controlled speed, and/or a belt may be trained about each row of rolls if desired to prevent the extrudate from expanding between the rolls.

The rolls 184 of the upper assembly 180 are secured between vertical side plates 188 and 190. The side plates 188 and 190 are parallel to one another and are interconnected by the transverse connecting members 192 and 194. In like manner, the rolls 186 of the lower assembly 182 are connected between vertical side plates 196 and 198 which are interconnected by transverse connecting elements 200 and 202. The rolls of each assembly preferably are arranged in a common plane, but may be slightly arcuately arranged to provide a slightly concave extrudate engaging surface. If plates are employed, such plates may be flat or slightly concave.

The upstream ends of the vertical side plates 188 and 190 of the upper roll assembly 180 are pivotally supported by clevis brackets or hinges 204 and 206, respectively. The clevis brackets 204 and 206 are threaded on the threaded top portions of adjustment rods 208 and 210 which are journaled in pillow blocks 212 and 214 secured to the inside of the main frame elements 38 and 40, respectively. Similarly, the vertical side plates 196 and 198 of the lower roll assembly 182 are pivotally supported at their upstream ends by clevis brackets or hinges 216 and 218 which are threaded on the threaded bottom portions of the adjustment rods 208 and 210, respectively. The threaded top and bottom portions of the adjustment rods are reversely threaded whereupon rotation of each adjustment rod moves the clevis brackets threaded thereon uniformly towards and away from the extrudate pass line 32, or more accurately the transverse center plane of the extrusion die 20 since, as seen in FIG. 1, the upstream hinged ends of the upper and lower shaping roll assemblies preferably are located slightly upstream of the die orifice 30.

The downstream ends of the upper and lower shaping roll assemblies 180 and 182 are hinged to the upstream ends of the upper and lower conveyors 56 and 58, respectively. As seen in FIGS. 2 and 4, the side plates 188 and 190 of the upper roll assembly have at their downstream ends transversely aligned bores fitted on the respective end journals of the upstream belt roller 90 of the upper conveyor. In like manner, the downstream ends of the side plates 196 and 198 of the lower roll assembly are pivotally or hingedly supported on the end journals of the upstream belt roller 144 of the lower conveyor 58. Accordingly, the downstream ends of the upper and lower shaping roll assemblies 180 and 182 are adjustable toward and away from the extrudate pass line 32 along with the upstream rollers 90 and 144 of the upper and lower conveyors 56 and 58, respectively.

OPERATION

In set-up, the lower conveyor 58 is adjusted to a desired distance from the extrudate pass line 32 by adjusting the nuts 158 and 160 on the tie rods 154, 156, 166 and 168. The upstream and downstream ends of the lower conveyor 58 may be adjusted independently of each other to tilt the lower conveyor slightly to the extrudate pass line if desired. During such adjustment of the lower conveyor, the upstream belt roller 144 of the lower conveyor necessarily must move parallel to the extrudate pass line since it is hinged to the pivoting lower shaping roll assembly 182. Accordingly, the end journal brackets for the belt roller 144 initially may be loosely secured in the mounting blocks 140 therefor during such adjustment and thereafter fixedly secured upon proper positioning of the upstream belt roller 144. The end journal brackets for the downstream belt roller 142 of the lower roll assembly 182 thereafter can be adjusted in the mounting blocks therefor to obtain the proper belt tension.

Also during set-up, the extrusion die 16 may be adjusted axially along the extrudate pass line 32 to its desired position such as that indicated at 18. Additionally, the upstream ends of the shaping roll assemblies 180 and 182 may be spaced apart the desired distance by rotation of the adjustment rods 208 and 210. It will be appreciated that the shaping roll assemblies preferably are spaced apart a distance considerably greater than the gap thickness of the die orifice 30 such that the extrudate expands rapidly outwardly in all directions including slightly upstream of the die orifice as indicated at 220 in FIGS. 1 and 2. It also will be appreciated that during extrusion of the foaming material through the extrusion die orifice, the adjustment rods 208 and 210 may be finely adjusted to obtain desired shaping of the extrudate.

As previously indicated, each of the piston-cylinder assemblies 106–109 will be provided with controlled air pressure beneath the pistons of such assemblies to cause the upper conveyor 56 essentially to float. When this floating condition has been achieved, controlled pressure thereafter applied above the pistons of such assemblies will closely control the precise force application of the belt 86 against the surface of the foaming and expanding extrudate moving thereagainst. It should be appreciated that the force applied by the upstream assemblies 108 and 109 may be different than that applied by the downstream assemblies 106 and 107, as desired. In addition, the upper conveyor, being independently adjustably supported at its upstream and downstream ends by such assemblies, may pivot slightly with respect to the extrudate flow path to accommodate any slight further expansion of the extrudate.

As the upper conveyor 56 is adjustably and floatingly supported in the indicated manner, the downstream end of the upper shaping roll assembly 180 will be similarly adjustably floated, it being appreciated that the effective weight of the roll assembly 180 at the assemblies 108 and 109 will be compensated for by pressure applied beneath the pistons of such assemblies. As the upper roll assembly 180 pivots about its fixed pivot at its upstream end, the upper conveyor will swing slightly and generally parallel to the extrudate pass line 32.

Although the invention has been shown and described with reference to a preferred embodiment, it is obvious that equivalent alterations and modifications will occur to others skilled in the art upon the reading and understanding of this application. The present invention includes all such equivalent alterations and modifications, and is limited only by the scope of the following claims.

We claim:

1. A foam extrusion apparatus comprising an extrusion die having a die orifice, opposed surface shaping members on respective opposite sides of the extrudate flow path downstream of said die orifice, opposed surface finishing members on respective opposite sides of the extrudate flow path downstream of said surface shaping members, first hinge means pivotally supporting the upstream ends of said shaping members adjacent said die orifice, second hinge means pivotally connecting the downstream ends of said shaping members to said finishing members, respectively, and means adjustably supporting said finishing members for movement toward and away from the extrudate flow path as well as for movement along the extrudate flow path.

2. The apparatus of claim 1 wherein said means adjustably supporting includes piston-cylinder assemblies at the upstream and downstream ends of one finishing member, said assemblies being operative adjustably to support the upstream and downstream ends of said one finishing member.

3. The apparatus of claim 2 wherein said assemblies are pivotally mounted to allow for such movement of said one finishing member along the extrudate flow path.

4. The apparatus of claim 2 wherein said assemblies are further operative floatingly to support said one finishing member and to urge said one finishing member against the extrudate at controlled pressure.

5. The apparatus of claim 4 wherein the other finishing member is adjustably yet fixedly supported at its upstream and downstream ends.

6. The apparatus of claim 1 wherein each shaping member includes a row of rolls, each roll extending transversely of the extrudate flow path.

7. The apparatus of claim 6 wherein the rolls of each row are co-planar.

8. The apparatus of claim 6 wherein the rolls of each row are arcuately arranged.

9. The apparatus of claim 6 wherein each shaping member further includes side plates between which said rolls are journaled, and said first hinge means includes respective hinges for and supporting the upstream ends of said side plates.

10. The apparatus of claim 9 wherein said first hinge means includes adjustment means for adjustably moving the hinges for respective shaping members uniformly towards and away from the extrudate flow path.

11. The apparatus of claim 1 wherein said first hinge means includes means for adjustably moving the upstream ends of said shaping members uniformly towards and away from the extrudate flow path.

12. The apparatus of claim 1 wherein each finishing member includes an endless moving belt trained about transversely extending upstream and downstream sheaves, and each shaping member includes a row of rolls journaled between parallel side plates, said side plates being fitted on opposite end journals of the upstream sheave of the corresponding finishing member to effect the pivotal connection between each shaping member and corresponding finishing member.

13. A foam extrusion apparatus comprising an extrusion die having a die orifice, opposed extrudate shaping means on respective opposite sides of the extrudate flow path for shaping the extrudate passing therebetween, means pivotally supporting each shaping means at its upstream end adjacent but upstream of said die orifice so that extrudate exiting the die orifice can expand in all directions and engage said shaping means slightly upstream of said die orifice, and means adjustably supporting each shaping means at its downstream end for pivotal adjustment of said shaping means about its pivoted end.

14. The apparatus of claim 13 wherein said means adjustably supporting includes means operative adjustably and floatingly to support one shaping means at its downstream end.

15. The apparatus of claim 14 wherein the other shaping means is adjustably yet fixedly supported at its downstream end.

16. The apparatus of claim 13 wherein each shaping means has a slightly concave extrudate engaging surface.

17. The apparatus of claim 13 wherein each shaping means includes a row of rolls, each roll extending transversely of the extrudate path.

18. The apparatus of claim 17 wherein the rolls of each row are coplanar.

19. The apparatus of claim 17 wherein the rolls of each row are arcuately arranged.

20. The apparatus of claim 13 wherein said means pivotally supporting includes respective hinges for and supporting the upstream ends of said shaping means, and further comprising adjustment means for adjustably moving said hinges uniformly towards and away from the extrudate pass line.

21. The apparatus of claim 20 wherein said adjustment means includes a rotatable rod having reversely threaded sections in threaded driving engagement with said hinges, respectively.

22. The apparatus of claim 13 including opposed conveyors on respective opposite sides of the extrudate pass line respectively supporting the downstream ends of said shaping means, and means adjustably supporting said conveyor with respect to the extrudate pass line.

23. The apparatus of claim 13 wherein said extrusion die is adjustable in the direction of the extrudate pass line.

24. A foam extrusion apparatus adapted to be positioned downstream of an extrusion die orifice comprising opposed surface shaping members positionable on opposite sides of the extrudate flow path, and piston-cylinder assemblies at the upstream and downstream ends of one shaping member, said assemblies being operative adjustably to support respective upstream and downstream ends of said one shaping member.

25. A foam extrusion apparatus comprising an extrusion die having a die orifice, opposed planar surface shaping members on respective opposite sides of the extrudate flow path downstream of said die orifice, means adjustably supporting said shaping members with respect to the extrudate flow path, opposed extrudate restraining members intermediate said die orifice and shaping members on respective opposite sides of the extrudate flow path, means hingedly supporting the upstream ends of said restraining members adjacent said die orifice, and second hinge means pivotally connecting the downstream ends of said restraining members respectively to said shaping members, each restraining member including a row of rolls, each roll extending transversely of the extrudate path, each restraining member further including side plates between which said rolls are journaled, and said means hingedly supporting including respective hinges for and supporting the upstream ends of said side plates and adjustment means for adjustably moving the hinges for opposite restraining members uniformly towards and away from the extrudate flow path, said adjustment means including a rotatable rod having reversely threaded sections respectively in threaded driving engagement with the hinges for opposite restraining members whereby rotation of said rod drives said hinges for opposite restraining members uniformly towards and away from the extrudate flow path.

26. A foam extrusion apparatus comprising an extrusion die having a die orifice, opposed planar surface shaping members on respective opposite sides of the extrudate flow path downstream of said die orifice, means adjustably supporting said shaping members with respect to the extrudate flow path, opposed extrudate restraining members intermediate said die orifice and shaping members on respective opposite sides of the extrudate flow path, means hingedly supporting the upstream ends of said restraining members adjacent said die orifice, means hingedly connecting the downstream ends of said restraining members respectively to said shaping members, each planar surface of said shaping members being in the form of a moving belt, and means for controlling the speed of each moving belt, said means for controlling including a drag brake for each belt.

27. A foam extrusion apparatus comprising an extrusion die having a die orifice, opposed planar surface shaping members on respective opposite sides of the extrudate flow path downstream of said die orifice, means adjustably supporting said shaping members with respect to the extrudate flow path, opposed extrudate restraining members intermediate said die orifice and shaping members on respective opposite sides of the extrudate flow path, means hingedly supporting the upstream ends of said restraining members adjacent said die orifice, means hingedly connecting the downstream ends of said restraining members respectively to said shaping members, each planar surface of said shaping members being in the form of a moving belt, and means for controlling the speed of each moving belt, said means for controlling including a torque motor for each belt.

28. A foam extrusion apparatus comprising an extrusion die having a die orifice, opposed planar surface shaping members on respective opposite sides of the extrudate flow path downstream of said die orifice, means adjustably supporting said shaping members with respect to the extrudate flow path, opposed extrudate restraining members intermediate said die orifice and shaping members on respective opposite sides of the extrudate flow path, means hingedly supporting the upstream ends of said restraining members adjacent said die orifice, means hingedly connecting the downstream ends of said restraining members respectively to said shaping members, and transversely opposed extrudate edge engaging means between said planar surfaces, said edge engaging means being each in the form of a row of edge rolls, the axes of which extend normal to the extrudate flow path.

29. The apparatus of claim 28 wherein said edge rolls have concave extrudate engaging surfaces.

30. The apparatus of claim 28 wherein said edge rolls have convex extrudate engaging surfaces.

31. A foam extrusion apparatus comprising an extrusion die having a die orifice, opposed planar surface shaping members on respective opposite sides of the extrudate flow path downstream of said die orifice, means adjustably supporting said shaping members with respect to the extrudate flow path, opposed extrudate restraining members intermediate said die orifice and shaping members on respective opposite sides of the extrudate flow path, means hingedly supporting the upstream ends of said restraining members adjacent said die orifice, and means hingedly connecting the downstream ends of said restraining members respectively to said shaping members, the planar surfaces of said shaping members being generally rectangular, and said means adjustably supporting including a piston-cylinder assembly at each corner of the planar surface of one shaping member, the assemblies being operative to adjustably and floatingly support said one shaping member and to urge the planar surface thereof against the extrudate at a controlled pressure.

32. The apparatus of claim 31 wherein the other planar surface is adjustably yet fixedly supported at each corner.

33. A foam extrusion apparatus comprising an extrusion die having a die orifice, opposed planar surface shaping members on respective opposite sides of the extrudate flow path downstream of said die orifice, means adjustably supporting said shaping members with respect to the extrudate flow path, opposed extrudate restraining members intermediate said die orifice and shaping members on respective opposite sides of the extrudate flow path, means hingedly supporting the upstream ends of said restraining members adjacent said die orifice, and means hingedly connecting the downstream ends of said restraining members respectively to said shaping members, the planar surfaces of said shaping members being in the form of conveyors, each conveyor including an endless moving belt trained about transversely extending upstream and downstream sheaves, a frame, said sheaves having end journals adjustably supported on said frame, and said means adjustably supporting including a piston-cylinder assembly at each corner of the frame of one conveyor, each assembly being pivoted at one end to the conveyor frame and at its other end to a main frame.

34. The apparatus of claim 33 wherein the frame of the other conveyor is adjustably yet fixedly supported on said main frame at least at its upstream end, and said sheaves and belt of said other conveyor are supported on the frame thereof for adjustment generally parallel to the extrudate flow path.

35. The apparatus of claim 34 wherein the frame of said other conveyor is adjustably and floatingly supported at its downstream end.

36. A foam extrusion apparatus comprising an extrusion die having a die orifice, opposed extrudate shaping means on respective opposite sides of the extrudate pass line for shaping the extrudate passing therebetween to a generally rectangular cross-sectional shape, each shaping means being pivotally supported at its upstream end adjacent but slightly upstream of said die orifice and adjustably supported at its downstream end for pivotal adjustment of said shaping means about its pivoted end, opposed conveyors on respective opposite sides of the extrudate pass line respectively supporting the downstream ends of said shaping means, and means adjustably supporting said conveyor with respect to the extrudate pass line, each conveyor including a moving belt and means for controlling the speed of said belt, said means for controlling including a drag brake for each belt.

37. A foam extrusion apparatus comprising an extrusion die having a die orifice, opposed extrudate shaping means on respective opposite sides of the extrudate pass line for shaping the extrudate passing therebetween to a generally rectangular cross-sectional shape, each shaping means being pivotally supported at its upstream end adjacent but slightly upstream of said die orifice and adjustably supported at its downstream end for pivotal adjustment of said shaping means about its pivoted end, opposed conveyors on respective opposite sides of the extrudate pass line respectively supporting the downstream ends of said shaping means, means adjustably supporting said conveyor with respect to the extrudate pass line, and transversely opposed extrudate edge engaging means between said conveyors, said edge engaging means each being in the form of a row of edge rolls, the axes of which extend normal to the extrudate flow path.

* * * * *